US011243798B2

(12) United States Patent
Chou

(10) Patent No.: US 11,243,798 B2
(45) Date of Patent: Feb. 8, 2022

(54) NETWORK FUNCTION VIRTUALIZATION INFRASTRUCTURE PERFORMANCE

(71) Applicant: Apple Inc., Cupertino, CA (US)

(72) Inventor: Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 14 days.

(21) Appl. No.: 16/499,847

(22) PCT Filed: Apr. 23, 2018

(86) PCT No.: PCT/US2018/028911
§ 371 (c)(1),
(2) Date: Sep. 30, 2019

(87) PCT Pub. No.: WO2018/200397
PCT Pub. Date: Nov. 1, 2018

(65) Prior Publication Data
US 2020/0104154 A1    Apr. 2, 2020

Related U.S. Application Data

(60) Provisional application No. 62/489,075, filed on Apr. 24, 2017.

(51) Int. Cl.
*G06F 9/455* (2018.01)
*G06F 9/50* (2006.01)
*H04L 12/24* (2006.01)

(52) U.S. Cl.
CPC ........ *G06F 9/45558* (2013.01); *G06F 9/5077* (2013.01); *H04L 41/0893* (2013.01);
(Continued)

(58) Field of Classification Search
CPC combination set(s) only.
See application file for complete search history.

(56) References Cited

U.S. PATENT DOCUMENTS 9,465,639 B2 * 10/2016 Chen ............... G06F 9/45558
2016/0205004 A1 * 7/2016 Chou ................. H04L 41/142
709/224
(Continued)

FOREIGN PATENT DOCUMENTS

WO    2018/106604 A1    6/2018
WO    2018/148135 A1    8/2018

OTHER PUBLICATIONS

Extended European Search Report dated Dec. 4, 2020 for European Patent Application 18790240.8.
(Continued)

*Primary Examiner* — Xavier S Wong
(74) *Attorney, Agent, or Firm* — Eschweiler & Potashnik, LLC

(57) ABSTRACT

This disclosure describes systems, methods, and apparatuses related to network function virtualization infrastructure (NFVI) performance. An apparatus may receive performance data from a network function virtualization infrastructure (NFVI) associated with one or more virtualized resources (VRs) of the NFVI. The apparatus may determine a collection method based on the received performance data. The apparatus may determine a performance measurement associated with the collection method. The apparatus may perform the performance measurement using the received performance data and the collection method. The apparatus may generate one or more outputs based on the performance measurement. The apparatus may cause to send the one or more outputs to a VNF manager (VNFM).

6 Claims, 7 Drawing Sheets

(52) U.S. Cl.
CPC .............. *G06F 2009/45595* (2013.01); *G06F 2201/815* (2013.01)

(56) References Cited

U.S. PATENT DOCUMENTS

| | | | |
|---|---|---|---|
| 2017/0078216 A1* | 3/2017 | Adolph | G06F 9/45558 |
| 2017/0094377 A1* | 3/2017 | Herdrich | H04L 41/5009 |
| 2017/0171015 A1* | 6/2017 | Lin | H04L 47/78 |
| 2017/0208019 A1* | 7/2017 | Shimojou | H04L 41/0896 |
| 2017/0250870 A1* | 8/2017 | Zhao | H04L 63/20 |
| 2018/0018244 A1* | 1/2018 | Yoshimura | G06F 9/5077 |
| 2018/0069749 A1* | 3/2018 | Singhal | H04L 41/0681 |
| 2018/0219744 A1* | 8/2018 | Rajagopal | H04L 67/28 |
| 2019/0141572 A1* | 5/2019 | Zaks | H04W 76/12 |

OTHER PUBLICATIONS

"Virtual CPU performance measurements." Source: Intel Corporation (UK) Ltd. NFVIFA(16)0001460. Nov. 30, 2016.
"Network Function Virtualisation (NFV); Management and Orchestration; Vi-Vnfm Reference Point—Interface and Information Model Specification." ETSI GS NFV-IFA006 V0.8.1 (Dec. 2015).
"Virtualized resources Metrics." ETSI Draft: NFVTST(17)000025. ETSI. Source: Intel Corporation (UK) LTD. Feb. 11, 2017.
"IFA 027 Virtual storage usage metrics." Source: Intel Corporation (UK) Ltd. ETSI. NFVIFA(17)000071. Feb. 7, 2017.
"IFA 027 networking data volume metrics." Source: Intel Corporation (UK) Ltd. ETSI. NFVIFA(17)000072. Feb. 7, 2017.

\* cited by examiner

NETWORK FUNCTION VIRTUALIZATION INFRASTRUCTURE PERFORMANCE

CROSS-REFERENCE TO RELATED APPLICATION(S)

This application is a U.S. National Stage Application under 35 U.S.C. 371 and claims the priority benefit of International Application No. PCT/US2018/028911, filed Apr. 23, 2018, which claims the benefit of U.S. Provisional Application 62/489,075, filed Apr. 24, 2017, the disclosures of which are incorporated herein by reference as if set forth in full.

TECHNICAL FIELD

This disclosure generally relates to systems, methods, and devices for wireless communications and, more particularly, network function virtualization infrastructure (NFVI) performance.

BACKGROUND

Traditionally, equipment for wireless communications networks may be deployed as physical equipment having software and hardware bound together. However, virtualization technologies have evolved to support network function software that may be executed by commercial hardware.

DETAILED DESCRIPTION

Figure 1:
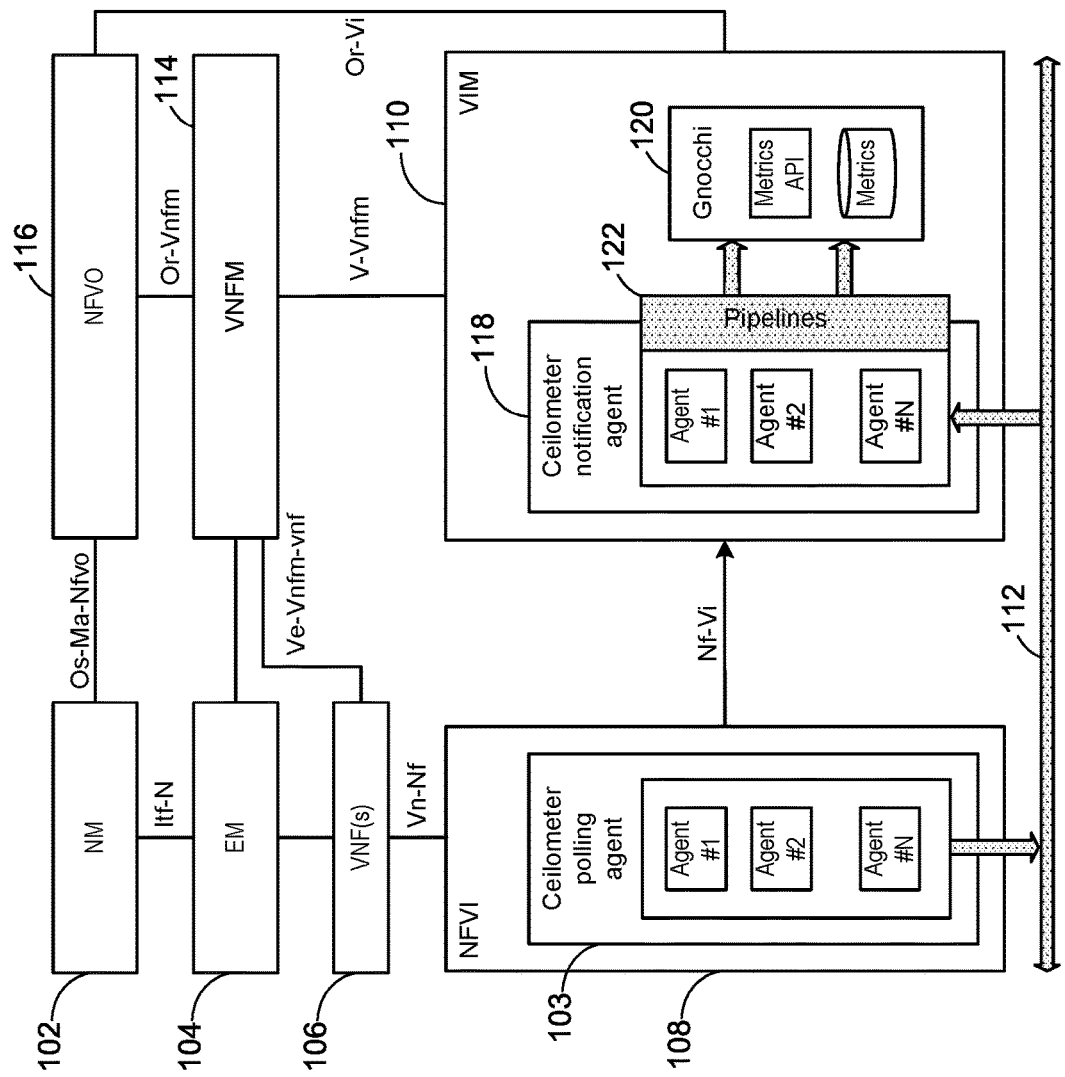
FIG. 1 depicts a block diagram of a performance system illustrating a collection of one or more devices and pipelines of performance metrics from network functions virtualization infrastructure (NFVI), in accordance with one or more example embodiments of the present disclosure.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Use of virtualization technologies may allow for a more flexible, quickly deployable or cost-effective wireless communications network to be built, deployed, and maintained. However, these virtualized networks may be based on disaggregated physical elements (e.g., processors, memory, and storage) composed to form virtualized resources (VRs) that support one or more types of virtualized network functions (VNFs). The VNFs may also be arranged to provide network services. These disaggregated physical elements composed to form VRs may be widely disbursed across various entities or locations in the cloud that host the physical equipment provisioned to compose the VRs. A management architecture and various management functions may be used to control and/or manage the one or more VNFs as well as the VRs allocated to support them. In some cases, the management architecture may be built on traditional management architectures and management functions that were used for control or management of non-virtualized wireless communications networks.

Embodiments herein relate to generating network function virtualization infrastructure (NFVI) performance metrics based on an OpenStack telemetry service, by collecting metrics associated with virtual central processing units (CPUs), storage devices, and networking metrics associated with the virtual machine instances.

In one or more embodiments, an NFVI performance system may facilitate a mechanism for collecting the virtualized resources consumed by one or more VNFs. For example, an operator may need a way to monitor the usage metrics of CPU, memory, storage, and network resources associated with the one or more VNFs and adjust one or more resources based on the performance metrics.

In one or more embodiments, an NFVI performance system may include a telemetry service comprising a ceilometer polling agent, a ceilometer notification agent, ceilometer pipelines, and a Gnocchi. It should be understood that Gnocchi is a time-series database and resource indexing service.

In one or more embodiments, the NFVI performance system may facilitate that the OpenStack ceilometer notification agent may receive messages that contain telemetry metrics from the OpenStack ceilometer polling agent and may request publishing pipelines associated with the OpenStack ceilometer polling agent to process the telemetry metrics. The OpenStack ceilometer notification agent may send the outputs of the pipelines to the Gnocchi for publishing.

In one or more embodiments, the ceilometer polling agent in the NFVI may poll a VM (virtual machine) periodically to collect the usage data of virtual CPUs (vCPUs), memory, disks, and networking resources within an OpenStack deployment.

In one or more embodiments, the telemetry service may comprise one or more of the following meter types: a cumulative to count the number of events in an interval (e.g., networking bytes or packets) and/or a gauge to measure the discrete event with fluctuating values in an interval (e.g., vCPU, memory, disk usages).

In one or more embodiments, the ceilometer polling agent may periodically poll to collect the resource usage metrics that comprise at least one of: a CPU utilization (cpu_util) measurement that is a gauge counter to measure the percentage of CPU utilization of a VM instance in a polling interval; a memory measurement that is a gauge counter to measure the volumes of random access memory (RAM) allocated to a VM instance in a polling interval; a memory usage (memory.usage) measurement that is a gauge counter to measure the volumes of RAM used by a VM instance in a polling interval; a disk measurement that is a gauge counter to measure the amount of disk occupied by a VM instance in a polling interval; a disk usage (disk.usage) measurement that is a gauge counter to measure the volumes of disks used by a VM instance in a polling interval; a network incoming bytes (network.incoming.bytes) measurement that is a cumulative counter to measure the number of incoming bytes received by a VM instance in a polling interval; a network outgoing bytes (network.outgoing.bytes) measurement that is a cumulative counter to measure the number of outgoing bytes received by a VM instance in a polling interval; a network incoming packets (network.incoming.packets) measurement that is a cumulative counter to measure the number of incoming packets received by a VM instance in a polling interval; and a network outgoing packets (network.outgoing.packets) measurement that is a cumulative counter to measure the number of outgoing packets received by a VM instance in a polling interval.

In one or more embodiments, upon collecting the resource usage metrics, the ceilometer polling agent may send the resource usage metrics to the ceilometer notification agent that is located in the virtualized infrastructure manager (VIM).

In one or more embodiments, the ceilometer notification agent may receive the resource usage metrics from the ceilometer polling agent and may use the cpu_util measurement to create the cpu_utilization metric; may send the virtual CPU usage metric to Gnocchi; and may use the network.incoming.bytes measurement to create the number of incoming bytes (num_of_incoming_bytes) metric and send the network incoming bytes metric to Gnocchi. In one or more embodiments, the ceilometer notification agent may use the network.outgoing.bytes measurement to create the number of outgoing bytes (num_of_outgoing_bytes) metric and send the network outgoing bytes metric to Gnocchi; use the network.incoming.packets measurement to create the num_of_incoming_packets metric and send the network incoming packets metric to Gnocchi; and use the network.outgoing.packets measurement to create the num_of_outgoing_packets metric and send the network outgoing packets metric to Gnocchi.

In one or more embodiments, the ceilometer notification agent may invoke the pipeline processing that contains a transformer to perform arithmetic calculations using the equation of memory_utilization=100*memory.usage/memory to produce the memory_utilization metric that is the percentage of memory usage by a VM instance in a polling interval; and invoke the pipeline processing that contains a transformer to perform arithmetic calculations using the equation of disk_utilization=100*disk.usage/disk.allocation to produce the disk utilization metric that is the percentage of disk usage by a VM instance in a polling interval.

In one or more embodiments, the ceilometer notification agent may send the memory_utilization metric to Gnocchi and may send the disk_utilization metric to Gnocchi.

In one or more embodiments, the NFVI performance system may include a virtualized infrastructure manager (VIM). The VIM may receive the resource usage metrics from the NFVI. The VIM may use a collection method to process the resource usage metrics that were received within a collection period to generate the virtualized resource usage measurement for a virtualized resource. The VIM may report the virtualized resource usage measurement to a virtualized network function manager (VNFM).

In one or more embodiments, the VIM may implement a status counter collection mechanism that may receive a metric at each sampling interval; perform the arithmetic mean computation of the metrics received in the collection period to generate the mean usage measurement; and select the maximum of the metrics received in the collection period to generate the peak usage measurement.

In one or more embodiments, the VIM may implement a transparent forwarding collection mechanism that may receive a metric at each sampling interval and generate a measurement that contains the value of the metric just received.

In one or more embodiments, the collection interval may be a multiple of the sampling interval.

In one or more embodiments, upon receiving the resource usage metrics from the NFVI, and based on the status counter collection mechanism, the VIM may perform the arithmetic mean of the cpu_utilization metrics that were received within a collection period to generate the mean virtual CPU usage measurement. The VIM may perform the arithmetic mean of the memory_utilization metrics that were received within a collection period to generate the mean memory usage measurement. The VIM may perform the arithmetic mean of the disk_utilization metrics that were received within a collection period to generate the mean disk usage measurement. The VIM may select the maximum metric among the cpu_utilization metrics that were received within a collection period to generate the peak virtual CPU usage measurement. The VIM may select the maximum metric among the memory_utilization metrics that were received within a collection period to generate the peak memory usage measurement. The VIM may select the maximum metric among the disk_utilization metrics that were received within a collection period to generate the peak disk usage measurement.

In one or more embodiments, upon receiving the resource usage metrics from the NFVI, and based on the transparent forwarding collection mechanism, the VIM may generate the number of incoming bytes on the networking resource measurement that contains the content of the num_of_incoming_bytes measurement received from the NFVI. The VIM may generate the number of outgoing bytes on the networking resource measurement that contains the content of the num_of_outgoing_bytes measurement received from the NFVI. The VIM may generate the number of incoming packets on the networking resource measurement that contains the content of the num_of_incoming_packets measurement received from the NFVI. The VIM may generate the number of outgoing packets on the networking resource measurement that contains the content of the num_of_outgoing_packets measurement received from the NFVI.

In some examples, for a virtualized environment where 3rd Generation Partnership Project (3GPP) operation and management (OAM) entities are arranged to work with European Telecommunications Standards Institute (ETSI)

management and orchestration (MANO) entities for network functions virtualizations (NFVs), a VNF may be supported by network function virtualizations infrastructure (NFVI) having various types of physical elements such as processors, storage or memory provisioned or composed to form VRs to support the VNF. For these examples, the VNF and NFVI may be operated, managed, or hosted by separate entities. As a result, traditional management architectures and management functions that are to measure the performance of VNF applications may not work since some important performance measurements for NFVI supporting the VNF may not be available by measuring VNF(s) themselves. For example, mean/peak processor usage for processors composed (e.g., vCPUs) to form at least part of a VR arranged to support the VNF. These performance measurements may be important in order to deliver consistent and acceptable service quality to end users of a 3GPP wireless network, as well as to timely isolate and correct failure conditions. In addition, the performance measurements may be needed to reflect ways in which the VNF may be impacted by the performance (or lack thereof) of VRs composed from physical elements in the NFVI to support the VNF. Therefore, performance measurements of the VNF and for VRs composed from physical elements in the NFVI need to be measured and correlated to identify how the VNFs are impacted by the VR, and what actions can be taken to mitigate the impact. For example, if it is detected that the poor VNF performance is caused by the overloaded VR, then the mitigation is to allocate more VR to the VNF. It is with respect to these challenges that the examples described herein are needed.

On the side of the virtualization infrastructure, resources on the NFVI, such as CPU utilization, memory space, and processing cores in a data center, are managed by a VIM and provide resources for the instantiated VNF(s). The VIM is linked to the VNF orchestrator and sends, for example, indications such as key performance indicators (KPIs) for reporting on a load situation in the virtualization infrastructure, e.g., the load for cores in a processor, etc.

The Openstack telemetry service was originally designed to support billing systems for OpenStack cloud resources. Telemetry collects metrics by polling the infrastructure elements and also by consuming the notifications emitted by other OpenStack services. The list of metrics collected by telemetry grows continuously to include virtualized resource metrics (e.g., virtual CPU/memory usage data, networking data volumes) that can be used in the auto-scaling feature in the orchestration service.

The ceilometer project in the Openstack telemetry service is responsible for the collection of metrics.

FIG. 1 depicts a block diagram of a performance system illustrating a collection of one or more devices and pipelines of performance metrics from NFVI, in accordance with one or more example embodiments of the present disclosure. The one or more devices and/or pipelines of FIG. 1 may be virtual devices located in the cloud or physical devices.

The NFV performance system is illustrated to comprise a network manager (NM) 102, an element manager (EM) 104, one or more virtualized network functions (VNFs) 106, a network function virtualization infrastructure (NFVI) 108, a virtualized infrastructure manager (VIM) 110, a VNF manager (VNFM) 114, and an NFV orchestrator (NFVO) 116. The NFVI 108 may comprise a ceilometer polling agent 103 comprising one or more agents. The VIM 110 may comprise a ceilometer notification agent 118 comprising one or more agents and a Gnocchi device 120 connected to the ceilometer notification agent 118 using pipelines 122. The NFVI 108 and the VIM 110 may share a notification bus 112 to send and receive data such as performance metrics. FIG. 1 further shows the various interfaces connecting the one or more devices. The one or more interfaces comprise Os-Ma-Nfvo, Itf-N, Vn-Nf, Ve-Vnfm-vnf, Or-Vnfm, V-Vnfm, and Nf-Vi.

The ceilometer polling agent 103 in the NFVI 108 may poll a virtual machine periodically to collect the usage data of the virtual CPU, memory, disk, and networking resources within an OpenStack deployment. The ceilometer polling agent 103 then may send the metrics to the ceilometer notification agent 118 that is located in the VIM 110. The ceilometer notification agent 118 then uses pipelines 122 to process the metrics, and send the metrics to the Gnocchi 120.

ETSI GS NFV-TST008 specifies the performance metrics at the NFVI. The reporting of the performance metrics from the NFVI to the VIM is considered out of its scope. However, the performance metrics to be defined in the ETSI GS NFV-IFA027 are based on the NFVI metrics received at the VIM.

In one embodiment, an NFVI performance system may resolve the gap between ETSI GS NFV-TST008 and the present specification, by using OpenStack to report performance metrics from the NFVI to the VIM.

Table 1 provides the mapping of NFV-TST008 metrics to OpenStack compute measurements.

TABLE 1

TST008 to OpenStack measurements mapping table

| NFV-TST008 metrics | OpenStack Telemetry measurements | | | | | | |
|---|---|---|---|---|---|---|---|
| | Name | Type | Unit | Resource | Origin | Support | Note |
| Processor Utilization (see note 1) | cpu_util | Gauge | % | instance ID | Pollster | vSphere | Average CPU utilization |
| | memory | Gauge | MB | instance ID | Notification | Libvirt, Hyper-V | Volume of RAM allocated to the instance |
| Memory Buffered, Memory Cached, Memory Free, Memory Slab (see note 2) | memory.usage | Gauge | MB | instance ID | Pollster | vSphere | Volume of RAM used by the instance from the amount of its allocated memory |
| (see note 3) | disk.allocation | Gauge | B | instance ID | Pollster | Libvirt | The amount of disk occupied by the instance on the host machine |

TABLE 1-continued

TST008 to OpenStack measurements mapping table

| NFV-TST008 metrics | OpenStack Telemetry measurements | | | | | | |
|---|---|---|---|---|---|---|---|
| | Name | Type | Unit | Resource | Origin | Support | Note |
| (see note 4) | disk.usage | Gauge | B | instance ID | Pollster | Libvirt | The physical size in bytes of the image container on the host |
| Octet Count received | network.incoming.bytes | Cumulative | B | interface ID | Pollster | Libvirt, Hyper-V | Number of incoming bytes |
| Octet Count transmitted | network.outgoing.bytes | Cumulative | B | interface ID | Pollster | Libvirt, Hyper-V | Number of outgoing bytes |
| Packet Count received | network.incoming.packets | Cumulative | packet | interface ID | Pollster | Libvirt, Hyper-V | Number of incoming packets |
| Packet Count transmitted | network.outgoing.packets | Cumulative | packet | interface ID | Pollster | Libvirt, Hyper-V | Number of outgoing packets |

(note 1):
The size of the memory allocated to an instance can be derived from VirtualMemory.
(note 2):
The size of the memory used by an instance can be computed from the sum of Memory Buffered, Memory Cached, Memory Free, and Memory Slab.
(note 3):
The size of the disk allocated to an instance can be derived from VirtualStorageData.
(note 4):
ETSI NFV TST could not find a standard way to measure the disk usage.

In one or more embodiments, virtual computer-related measurements may be used to monitor the loading conditions of the virtual computer resources that include memory, CPU, and storage. One or more scale VNF operations may be used, which may include "scale up" and "scale down" operations. The "scale up" may be used for adding further resources to existing virtual network function component (VNFC) instances. For example, the "scale up" may be used to increase the memory, CPU capacity or storage size of the virtualization container hosting a VNFC instance, in order to increase VNF capacity. The "scale down" may be used for removing resources from existing VNFC instances; for example, decreased memory, CPU capacity or storage size of the virtualization container hosting a VNFC instance, in order to release unused capacity. Therefore, when the measurement indicates that the virtualized resources are overloaded, the "scale up" operation is used to increase memory, CPU capacity, or storage size allocated to a VNFC. When the measurement indicates that the virtualized resources are underloaded, the "scale down" operation is used to reduce memory, CPU capacity, or storage size allocated to a VNFC.

In one or more embodiments, an NFVI performance system may apply to use cases of network data volume related measurements. Network data volume related measurements may be used to measure the data volume of networking interfaces, including incoming and outgoing internet protocol (IP) data packets and octets. These measurements provide the transport bandwidth usage data. It is essential to analyze the transport bandwidth usage data. When the transport bandwidth usage is too high, then it may provide an indication that more networking resources are needed.

In one or more embodiments, an NFVI performance system may define one or more NFVI measurements (shown in Table 2) that are to be used to define the performance measurements.

TABLE 2

NFVI measurements:

| NFVI measurements | Description |
|---|---|
| cpu_utilization | Measure the percentage of CPU utilization, and is provided from OpenStack measurement cpu_util. |
| memory_utilization | Measure the percentage of memory utilization, and is provided from the processing of two OpenStack measurements: memory_utilization = 100 * memory. usage/memory |
| disk_utilization | Measure the percentage of disk utilization, and is provided from the processing of two OpenStack measurements: disk_utilization = 100 * disk. usage/disk.allocation |
| num_of_incoming_packets | The measurement is provided from OpenStack measurement network.incoming.packets. |
| num_of_outgoing_packets | The measurement is provided from OpenStack measurement network.outgoing.packets. |
| num_of_incoming_bytes | The measurement is provided from OpenStack measurement network.incoming.bytes. |
| num_of_outgoing_bytes | The measurement is provided from OpenStack measurement network.outgoing.bytes. |

In one or more embodiments, an NFVI performance system may define a measurement template that comprises one or more fields that may be used to describe the performance measurements that may be used between the NFVI and the VIM. For example, a collection method field may be used to define how a measurement is obtained. A collection method may be a status counter (SC) or a transparent forwarding (TF). An SC may define a counter for when an entity (e.g., VIM) receives a metric at each predetermined interval. For example, a measurement (e.g., arithmetic mean, peak, etc.) is generated from processing all of the samples received in the collection period. For example, the VIM could have a predetermined first collection period, while the NFVI may have been collecting metrics at a second collection interval. The NFVI may continue to send these metrics to the VIM, which may collect them during the predetermined first collection period.

In one or more embodiments, a TF may be defined where an entity maintains a measurement count that stores the content of the metric that it received.

In one or more embodiments, the measurement template may further comprise a trigger, which may cause the counter to be updated. For example, the trigger may be initiated by receiving one or more measurements from the NFVI at the VIM. The measurement template may also comprise a measurement unit, which contains the unit of the measurement value. The measurement template may also comprise a measurement group, which is the group to which a measurement belongs. The measurement template may also comprise a measured object type, which describes the object of a measurement. The object types for this field will be the types defined in the virtual resources information interface. One of the two alternatives (objectType+ objectFilter or objectInstanceId) may be present.

In one or more embodiments, an NFVI performance system may define one or more resource usage metrics associated with measurements received from an entity, such as the NFVI. The one or more usage metrics may comprise one or more of a mean virtual CPU usage measurement, a peak virtual CPU usage measurement, a mean memory usage measurement, a peak memory usage measurement, a mean disk usage measurement, a peak disk usage measurement, a number of incoming bytes on networking resource measurement, a number of outgoing bytes on networking resource measurement, a number of incoming packets on networking resource measurement, or a number of outgoing packets on networking resource measurement. The one or more usage metrics may be prepared in accordance with the measurement template.

In one embodiment, the mean virtual CPU usage may provide the mean virtual CPU usage of the virtualized compute resource. The collection method may be set as an SC. The trigger of the mean virtual CPU usage may be initiated when the VIM receives the cpu_utilization measurement from the NFVI at the predefined interval. The VIM may then take the arithmetic mean of the virtual CPU usage metrics received in the collection period. The measurement unit may be such that each measurement is a real value indicating the percentage of the virtual CPU resources that are used. The measurement group may be set to VirtualizedComputeResource and the measurement object may be set to objectType, and/or objectInstanceId.

In one embodiment, the peak virtual CPU usage measurement may provide the peak virtual CPU usage of the virtualized compute resource. The collection method may be set as an SC. The trigger of the peak virtual CPU usage measurement may be initiated when the VIM receives the cpu_utilization measurement from the NFVI at the predefined interval, and then selects the maximum metric among the virtual CPU usage metrics received in the collection period. The measurement unit may be such that each measurement is a real value indicating the percentage of the virtual CPU resources that are used. The measurement group may be set to VirtualizedComputeResource and the measurement object may be set to objectType, and/or objectInstanceId.

In one embodiment, the mean memory usage measurement may provide the mean memory usage of the virtualized storage resource. The collection method may be set as an SC. The trigger of the mean memory usage measurement may be initiated when the VIM receives the memory_utilization measurement from the NFVI at the predefined interval, and then takes the arithmetic mean of the memory usage metrics received in the collection period. The measurement unit may be such that each measurement is a real value indicating the percentage of the memory resources that are used. The measurement group may be set to VirtualizedComputeResource and the measurement object may be set to objectType, and/or objectInstanceId.

In one embodiment, the peak memory usage measurement may provide the peak memory usage of the virtualized compute resource. The collection method may be set as an SC. The trigger of the peak memory usage measurement may be initiated when the VIM receives the memory_utilization measurement from the NFVI at the predefined interval, and then selects the maximum metric among the memory usage metrics received in the collection period. The measurement unit may be such that each measurement is a real value indicating the percentage of the memory resources that are used. The measurement group may be set to VirtualizedComputeResource and the measurement object may be set to objectType and/or objectInstanceId.

In one embodiment, the mean disk usage measurement may provide the mean disk usage of the virtualized storage resource. The collection method may be set as an SC. The trigger of the mean disk usage measurement may be initiated when the VIM receives the disk_utilization measurement from the NFVI at the predefined interval, and then takes the arithmetic mean of the disk usage metrics received in the collection period. The measurement unit may be such that each measurement is a real value indicating the percentage of the disk resources that are used. The measurement group may be set to VirtualizedComputeResource and the measurement object may be set to objectType, and/or objectInstanceId.

In one embodiment, the peak disk usage measurement may provide the peak disk usage of the virtualized compute resource. The collection method may be set as an SC. The trigger of the peak disk usage measurement may be initiated when the VIM receives the disk_utilization measurement from the NFVI at the predefined interval, and then selects the maximum metric among the disk usage metrics received in the collection period. The measurement unit may be such that each measurement is a real value indicating the percentage of the disk resources that are used. The measurement group may be set to VirtualizedComputeResource and the measurement object may be set to objectType, and/or objectInstanceId.

In one embodiment, the number of incoming bytes on a networking resource measurement may provide the number of bytes received by the virtualized networking resource. The collection method may be set as a TF. The trigger of the number of incoming bytes on a networking resource measurement may be when the VIM receives the num_of_incoming_bytes measurement from the NFVI. The measurement unit may be such that each measurement is a real value indicating the transport network bandwidth usage. The measurement group may be set to VirtualizedNetworkingResource and the measurement object may be set to objectType, and/or objectInstanceId.

In one embodiment, the number of outgoing bytes on a networking resource measurement may provide the number of bytes transmitted by the virtualized networking resource. The collection method may be set to a TF. The trigger of the number of outgoing bytes on a networking resource measurement may be initiated when the VIM receives the num_of_outgoing_bytes measurement from the NFVI. The measurement unit may be such that each measurement is a real value indicating the transport network bandwidth usage. The measurement group may be set to VirtualizedNetworkingResource and the measurement object may be set to objectType, and/or objectInstanceId.

In one embodiment, the number of incoming packets on a networking resource measurement may provide the number of packets received by the virtualized networking resource. The collection method may be set to a TF. The trigger of the number of incoming packets on a networking resource measurement may be initiated when the VIM receives the num_of_incoming_packets measurement from the NFVI. The measurement unit may be such that each measurement is a real value indicating the transport network bandwidth usage. The measurement group may be set to VirtualizedNetworkingResource and the measurement object may be set to objectType, and/or objectInstanceId.

In one embodiment, the number of outgoing packets on a networking resource measurement may provide the number of packets transmitted by the virtualized networking resource. The collection method may be set to a TF. The trigger of the number of outgoing packets on a networking resource measurement may be initiated when the VIM receives the num_of_outgoing_packets measurement from the NFVI. The measurement unit may be such that each measurement is a real value indicating the transport network bandwidth usage. The measurement group may be set to VirtualizedNetworkingResource and the measurement object may be set to objectType, and/or objectInstanceId.

Figure 2:
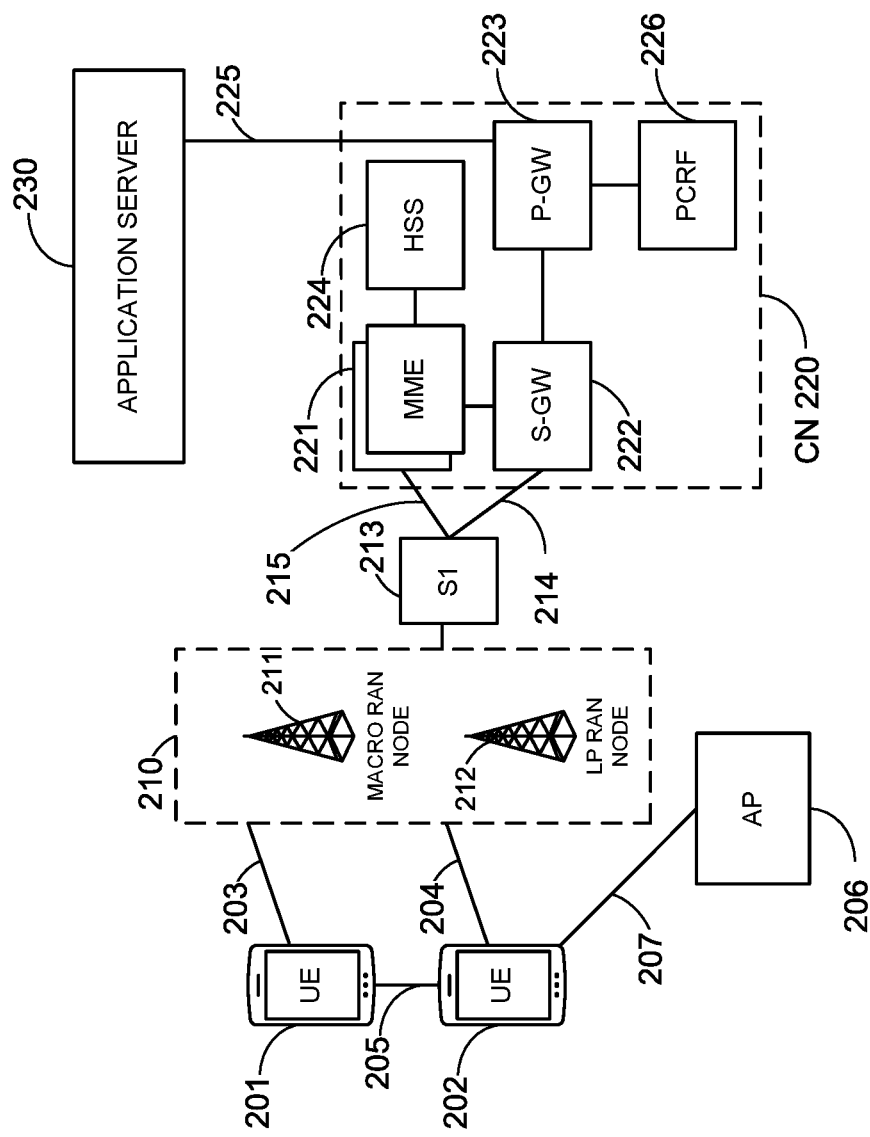
FIG. 2 depicts an architecture of a system of a network, in accordance with one or more example embodiments of the present disclosure.

FIG. 2 illustrates an architecture of a system 200 of a network in accordance with one or more embodiments of the present disclosure. The system 200 is shown to include a user equipment (UE) 201 and a UE 202. The UEs 201 and 202 are illustrated as smartphones (e.g., handheld touchscreen mobile computing devices connectable to one or more cellular networks), but may also comprise any mobile or non-mobile computing device, such as personal data assistants (PDAs), pagers, laptop computers, desktop computers, wireless handsets, or any computing device including a wireless communications interface.

In some embodiments, any of the UEs 201 and 202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), a Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 201 and 202 may be configured to connect, e.g., communicatively couple, with a radio access network (RAN) 210. The RAN 210 may be, for example, an Evolved Universal Mobile Telecommunications System (UMTS) Terrestrial Radio Access Network (E-UTRAN), a NextGen RAN (NG RAN), or some other type of RAN. The UEs 201 and 202 utilize connections 203 and 204, respectively, each of which comprises a physical communications interface or layer (discussed in further detail below); in this example, the connections 203 and 204 are illustrated as air interfaces to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 201 and 202 may further directly exchange communication data via a ProSe interface 205. The ProSe interface 205 may alternatively be referred to as a sidelink interface comprising one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 202 is shown to be configured to access an access point (AP) 206 via a connection 207. The connection 207 can comprise a local wireless connection, such as a connection consistent with any institute of electrical and electronics engineers (IEEE) 802.11 protocol, wherein the AP 206 would comprise a wireless fidelity (WiFi®) router. In this example, the AP 206 is shown to be connected to the Internet without connecting to the core network of the wireless system (described in further detail below).

The RAN 210 can include one or more access nodes that enable the connections 203 and 204. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 210 may include one or more RAN nodes for providing macrocells, e.g., macro RAN node 211, and one or more RAN nodes for providing femtocells or picocells (e.g., cells having smaller coverage areas, smaller user capacity, or higher bandwidth compared to macrocells), e.g., low power (LP) RAN node 212.

Any of the RAN nodes 211 and 212 can terminate the air interface protocol and can be the first point of contact for the UEs 201 and 202. In some embodiments, any of the RAN nodes 211 and 212 can fulfill various logical functions for the RAN 210 including, but not limited to, radio network controller (RNC) functions such as radio bearer management, uplink and downlink dynamic radio resource management and data packet scheduling, and mobility management.

In accordance with some embodiments, the UEs 201 and 202 can be configured to communicate using Orthogonal Frequency-Division Multiplexing (OFDM) communication signals with each other or with any of the RAN nodes 211 and 212 over a multicarrier communication channel in accordance with various communication techniques, such as, but not limited to, an Orthogonal Frequency-Division Multiple Access (OFDMA) communication technique (e.g., for downlink communications) or a Single Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 211 and 212 to the UEs 201 and 202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that can be allocated currently. There are several different physical downlink channels that are conveyed using such resource blocks.

The physical downlink shared channel (PDSCH) may carry user data and higher-layer signaling to the UEs 201 and 202. The physical downlink control channel (PDCCH) may carry information about the transport format and resource allocations related to the PDSCH channel, among other things. It may also inform the UEs 201 and 202 about the transport format, resource allocation, and H-ARQ (hybrid automatic repeat request) information related to the uplink shared channel. Typically, downlink scheduling (assigning control and shared channel resource blocks to the UE 102 within a cell) may be performed at any of the RAN nodes 211 and 212 based on channel quality information fed back from any of the UEs 201 and 202. The downlink resource assignment information may be sent on the PDCCH used for (e.g., assigned to) each of the UEs 201 and 202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four quadrature phase shift keying (QPSK) symbols may be mapped to each REG. The PDCCH can be transmitted using one or more CCEs, depending on the size of the downlink control information (DCI) and the channel condition. There can be four or more different PDCCH formats defined in the LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 210 is shown to be communicatively coupled to a core network (CN) 220 via an S1 interface 213. In some embodiments, the CN 220 may be an evolved packet core (EPC) network, a NextGen Packet Core (NPC) network, or some other type of CN. In this embodiment, the S1 interface 213 is split into two parts: the S1-U interface 214, which carries traffic data between the RAN nodes 211 and 212 and the serving gateway (S-GW) 222, and the S1-mobility management entity (MME) interface 215, which is a signaling interface between the RAN nodes 211 and 212 and the MMEs 221.

In this embodiment, the CN 220 comprises the MMEs 221, the S-GW 222, the Packet Data Network (PDN) Gateway (P-GW) 223, and a home subscriber server (HSS) 224. The MMEs 221 may be similar in function to the control plane of the legacy Serving General Packet Radio Service (GPRS) Support Nodes (SGSN). The MMEs 221 may manage mobility aspects in access such as gateway selection and tracking area list management. The HSS 224 may comprise a database for network users, including subscription-related information to support the network entities' handling of communication sessions. The CN 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc.

The S-GW 222 may terminate the S1 interface 213 towards the RAN 210, and may route data packets between the RAN 210 and the CN 220. In addition, the S-GW 222 may be a local mobility anchor point for inter-RAN node handovers and also may provide an anchor for inter-3GPP mobility. Other responsibilities may include lawful intercept, charging, and some policy enforcement.

The P-GW 223 may terminate an SGi interface toward a PDN. The P-GW 223 may route data packets between the EPC network and external networks such as a network including the application server 230 (alternatively referred to as an application function (AF)) via an Internet Protocol (IP) interface 225. Generally, the application server 230 may be an element offering applications that use IP bearer resources with the core network (e.g., UMTS Packet Services (PS) domain, LTE PS data services, etc.). In this embodiment, the P-GW 223 is shown to be communicatively coupled to an application server 230 via an IP interface 225. The application server 230 can also be configured to support one or more communication services (e.g., Voice-over-Internet Protocol (VoIP) sessions, PTT sessions, group communication sessions, social networking services, etc.) for the UEs 201 and 202 via the CN 220.

The P-GW 223 may further be a node for policy enforcement and charging data collection. Policy and charging enforcement function (PCRF) 226 is the policy and charging control element of the CN 220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate quality of service (QoS) and charging parameters. The PCRF 226 may provision this rule into a policy and charging enforcement function (PCEF) (not shown) with the appropriate traffic flow template (TFT) and QoS class of identifier (QCI), which commences the QoS and charging as specified by the application server 230.

Figure 3:
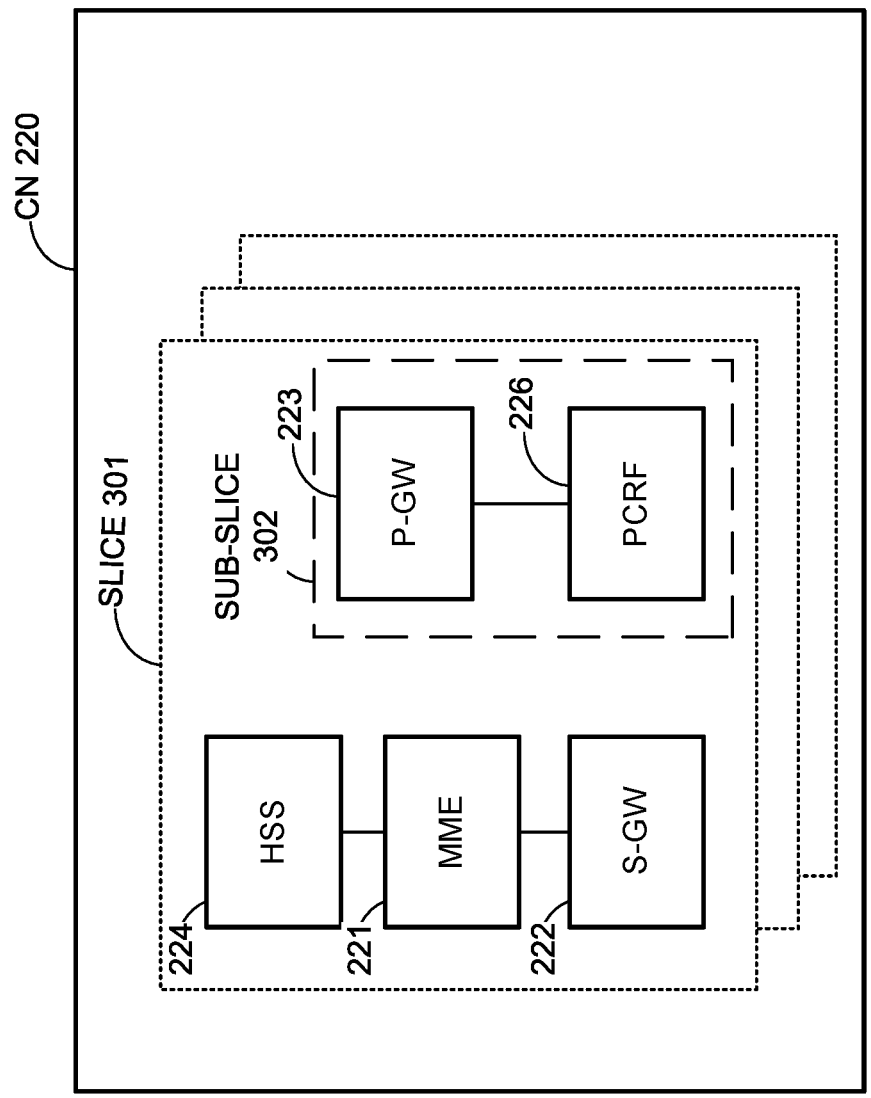
FIG. 3 depicts components of a core network, in accordance with one or more example embodiments of the present disclosure.

FIG. 3 depicts components of a core network, in accordance with one or more example embodiments of the present disclosure.

Referring to FIG. 3 while still referring to FIG. 2, the components of the CN 220 of FIG. 2 may be implemented in one physical node or separate physical nodes including components to read and execute instructions from a machine-readable or computer-readable medium (e.g., a non-transitory machine-readable storage medium). In some embodiments, network function virtualization (NFV) is utilized to virtualize any or all of the above described network node functions via executable instructions stored in one or more computer-readable storage mediums (described in further detail below). A logical instantiation of the CN 220 may be referred to as a network slice 301. A logical instantiation of a portion of the CN 220 may be referred to as a network sub-slice 302 (e.g., the network sub-slice 302 is shown to include the P-GW 223 and the PCRF 226).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 4A:
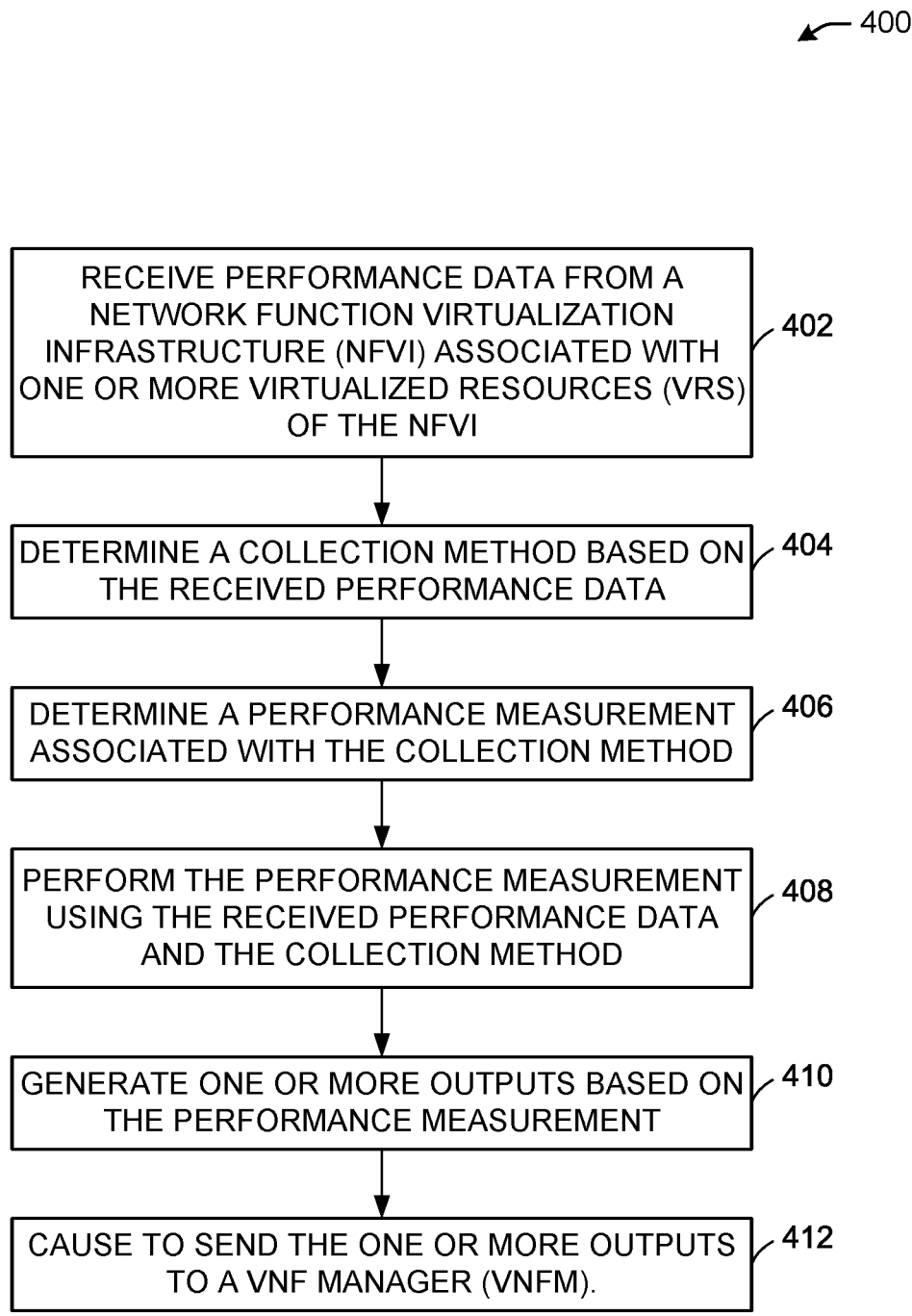
FIG. 4A illustrates a flow diagram of an illustrative process for an illustrative NFVI performance system, in accordance with one or more example embodiments of the present disclosure.

FIG. 4A illustrates a flow diagram of an illustrative process 400 for an illustrative NFVI performance system, in accordance with one or more example embodiments of the present disclosure.

At block 402, a VIM (e.g., VIM 110 of FIG. 1) may receive performance data from an NFVI (e.g., NFVI 108 of FIG. 1) associated with one or more virtualized resources (VRs) of the NFVI. The VIM may be linked to the VNF orchestrator and may send, for example, indications such as KPIs for reporting on a load situation in the virtualization infrastructure, e.g., NFVI. The VIM may comprise a ceilometer notification agent comprising one or more agents and a Gnocchi device connected to the ceilometer notification agent using one or more pipelines. The NFVI may poll a virtual resource (e.g., a VNF and/or a VM) periodically to collect the usage data of virtual CPU, memory, disk, and networking resources within an OpenStack deployment. The ceilometer polling agent then may send the metrics to the ceilometer notification agent that is located in the VIM.

At block 404, the VIM determine a collection method based on the received performance data. For example, a collection method field may be used to define how a measurement is obtained. A collection method may be a status counter (SC) or a transparent forwarding (TF). An SC may define a counter for when an entity (e.g., VIM) receives a metric at each predetermined interval.

At block 406, the VIM may determine a performance measurement associated with the collection method. For example, upon receiving the resource usage metrics from the NFVI, and based on the status counter collection mechanism, the VIM may perform one or more performance measurements. The one or more performance measurements may be metrics associated with resource usage and may comprise one or more of a mean virtual CPU usage measurement, a peak virtual CPU usage measurement, a mean memory usage measurement, a peak memory usage measurement, a mean disk usage measurement, a peak disk usage measurement, a number of incoming bytes on networking resource measurement, a number of outgoing bytes on networking resource measurement, a number of incoming packets on networking resource measurement, or a number of outgoing packets on networking resource measurement. The one or more usage metrics may be prepared in accordance with the measurement template.

At block 408, the VIM may perform the performance measurement using the received performance data and the collection method. For example, upon receiving the resource usage metrics from the NFVI, and based on the status counter collection mechanism, the VIM may perform the arithmetic mean of the cpu_utilization metrics that were received within a collection period to generate the mean virtual CPU usage measurement. The VIM may perform the arithmetic mean of the memory_utilization metrics that were received within a collection period to generate the mean memory usage measurement. The VIM may perform the arithmetic mean of the disk_utilization metrics that were received within a collection period to generate the mean disk usage measurement. The VIM may select the maximum metric among the cpu_utilization metrics that were received within a collection period to generate the peak virtual CPU usage measurement. The VIM may select the maximum metric among the memory_utilization metrics that were received within a collection period to generate the peak memory usage measurement. The VIM may select the maximum metric among the disk_utilization metrics that were received within a collection period to generate the peak disk usage measurement. In one or more embodiments, upon receiving the resource usage metrics from the NFVI, and based on the transparent forwarding collection mechanism, the VIM may generate the number of incoming bytes on a networking resource measurement that contains the content of the num_of_incoming_bytes measurement received from the NFVI. The VIM may generate the number of outgoing bytes on a networking resource measurement that contains the content of the num_of_outgoing_bytes measurement received from the NFVI. The VIM may generate the number of incoming packets on a networking resource measurement that contains the content of the num_of_incoming_packets measurement received from the NFVI. The VIM may generate the number of outgoing packets on a networking resource measurement that contains the content of the num_of_outgoing_packets measurement received from the NFVI. The one or more telemetry measurements may comprise a mean virtual CPU usage, a mean memory usage, a mean disk usage, a peak disk usage, a number of incoming bytes on the networking resource, a number of outgoing bytes on the networking resource, a number of incoming packets on the networking resource, or a number of outgoing packets on the networking resource. A telemetry measurement may comprise one or more of the following meter types: a cumulative to count the number of events in an interval (e.g., networking bytes or packets) and/or a gauge to measure the discrete event with fluctuating values in an interval (e.g., vCPU, memory, disk usages). The telemetry measurements are determined during a collection interval.

At block 410, the VIM may generate one or more outputs based on the one or more telemetry measurements. The VIM may use a collection method to process the resource usage metrics that were received within a collection period to generate the virtualized resource usage measurement for a virtualized resource. For example, the VIM may implement a status counter collection mechanism that may receive a metric at each sampling interval; perform the arithmetic mean computation of the metrics received in the collection period to generate the mean usage measurement; and select the maximum of the metrics received in the collection period to generate the peak usage measurement.

At block 412, the VIM may cause to send the outputs to a VNFM. For example, the VIM may report the virtualized resource usage measurement to the VNFM. The VNFM made then determined to adjust one or more of the virtual resources based on the measurements.

It is understood that the above descriptions are for purposes of illustration and are not meant to be limiting.

Figure 4B:
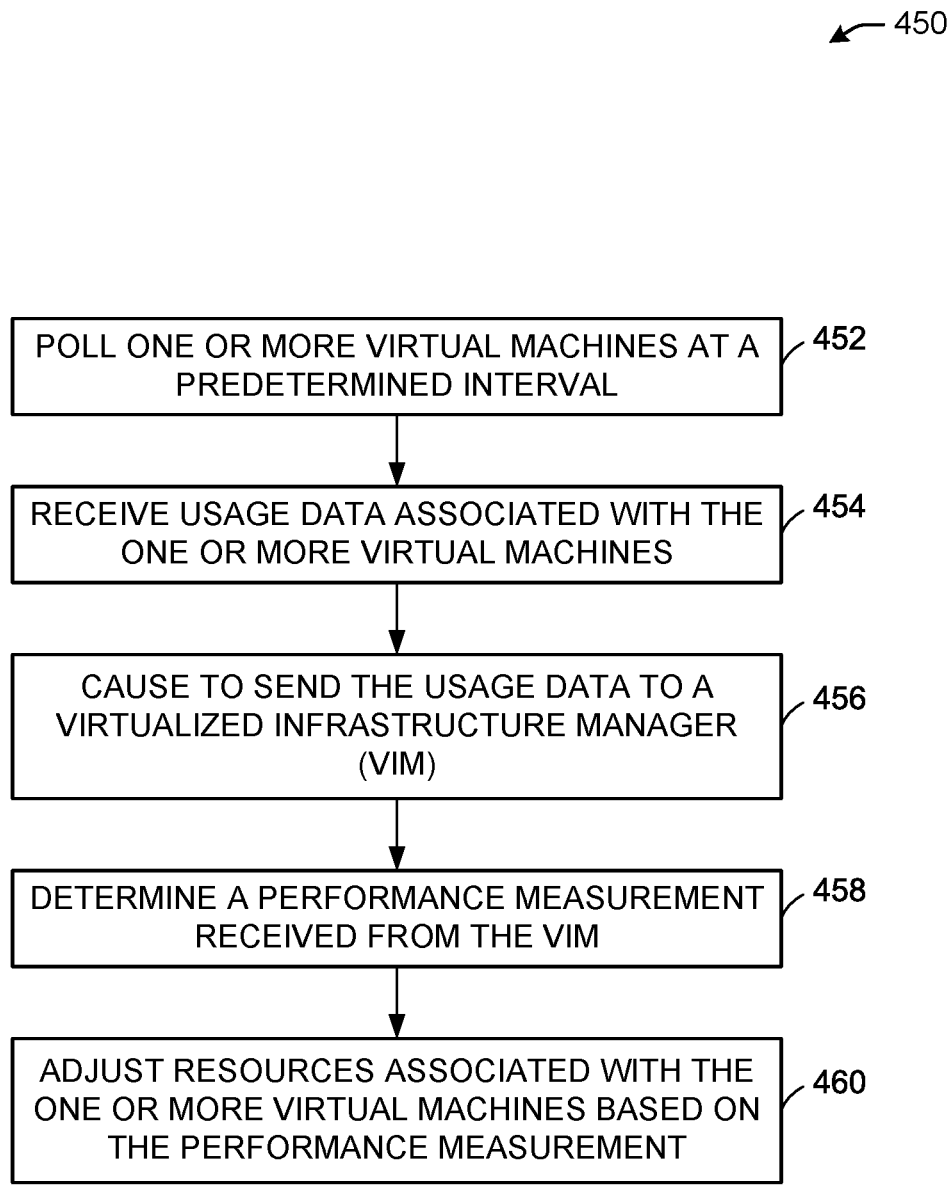
FIG. 4B illustrates a flow diagram of an illustrative process for an illustrative NFVI performance system, in accordance with one or more example embodiments of the present disclosure.

FIG. 4B illustrates a flow diagram of an illustrative process 450 for an illustrative NFVI performance system, in accordance with one or more example embodiments of the present disclosure.

At block 452, an NFVI (e.g., the NFVI 108 of FIG. 1) may poll, by a ceilometer polling agent of a NFVI, one or more virtual machine (e.g., a VNF and/or a VM) at a predetermined interval. The NFVI may comprise a ceilometer polling agent, which may request publishing pipelines associated with the OpenStack ceilometer polling agent to process the telemetry metrics. The ceilometer polling agent in the NFVI may poll a VM periodically to collect the usage data of vCPUs, memory, disk, and networking resources within an OpenStack deployment.

At block 454, the NFVI may receive usage data associated with the one or more virtual machines. For example, the ceilometer polling agent of the NFVI may periodically poll to collect the resource usage metrics that comprise at least one of: a CPU utilization (cpu_util) measurement that is a gauge counter to measure the percentage of CPU utilization of a VM instance in a polling interval; a memory measurement that is a gauge counter to measure the volumes of random access memory (RAM) allocated to a VM instance in a polling interval; a memory usage (memory.usage) measurement that is a gauge counter to measure the volumes of RAM used by a VM instance in a polling interval; a disk measurement that is a gauge counter to measure the amount of disk occupied by a VM instance in a polling interval; a disk usage (disk.usage) measurement that is a gauge counter to measure the volumes of disks used by a VM instance in a polling interval; a network incoming bytes (network.incoming.bytes) measurement that is a cumulative counter to measure the number of incoming bytes received by a VM instance in a polling interval; a network outgoing bytes (network.outgoing.bytes) measurement that is a cumulative counter to measure the number of outgoing bytes received by a VM instance in a polling interval; a network incoming packets (network.incoming.packets) measurement that is a cumulative counter to measure the number of incoming packets received by a VM instance in a polling interval; and a network outgoing packets (network.outgoing.packets) measurement that is a cumulative counter to measure the number of outgoing packets received by a VM instance in a polling interval.

At block 456, the NFVI may cause to send the usage data to a VIM. Upon collecting the resource usage metrics, the ceilometer polling agent may send the resource usage metrics to the ceilometer notification agent that is located in the VIM.

At block 458, the NFVI may determine a performance measurement received from the VIM, wherein the performance measurement is associated with the usage data, and wherein the performance measurement is determined during a collection interval. For example, the ceilometer notification agent of the VIM may receive the resource usage metrics from ceilometer polling agent of the NFVI and may use the cpu_util measurement to create the cpu_utilization metric; may send the virtual CPU usage metric to Gnocchi; may use the network.incoming.bytes measurement to create the number of incoming bytes (num_of_incoming_bytes) metric and send the network incoming bytes metric to Gnocchi. In one or more embodiments, the ceilometer notification agent may use the network.outgoing.bytes measurement to create the number of outgoing bytes (num_of_outgoing_bytes) metric and send the network outgoing bytes metric to Gnocchi; use the network.incoming.packets measurement to create the num_of_incoming_packets metric and send the network incoming packets metric to Gnocchi; and use the network.outgoing.packets measurement to create the num_of_outgoing_packets metric and send the network outgoing packets metric to Gnocchi. The ceilometer notification agent may invoke the pipeline processing that contains a transformer to perform arithmetic calculations using the equation of memory_utilization=100*memory.usage/memory to produce the memory_utilization metric that is the percentage of memory usage by a VM instance in a polling interval; and invoke the pipeline processing that contains a transformer to perform arithmetic calculations using the equation of disk_utilization=100*disk.usage/disk.allocation to produce the disk_utilization metric that is the percentage of disk usage by a VM instance in a polling interval. The ceilometer notification agent may send the memory utilization metric to Gnocchi and may send the disk_utilization metric to Gnocchi.

At block 460, the NFVI may adjust resources based on the telemetry measurements associated with the usage data. For example, in virtual computer related measurements, the measurements may be used to monitor the loading conditions of virtual computer resources that include memory, CPU, and storage. One or more scale VNF operations may be used, which may include "scale up" and "scale down" operations. The "scale up" may be used for adding further resources to existing virtual network function component (VNFC) instances. For example, the "scale up" may be used to increase memory, CPU capacity or storage size of the virtualization container hosting a VNFC instance, in order to increase VNF capacity. The "scale down" may be used for removing resources from existing VNFC instances; for example, to decrease memory, CPU capacity or storage size of the virtualization container hosting a VNFC instance in order to release unused capacity. Therefore, when the measurement indicates that the virtualized resources are overloaded, the "scale up" operation is used to increase memory, CPU capacity, or storage size allocated to a VNFC. When the measurement indicates that the virtualized resources are underloaded, the "scale down" operation is used to reduce memory, CPU capacity, or storage size allocated to a VNFC.

It is understood that the above descriptions are for purposes of illustration and are not meant to be limiting.

Figure 5:
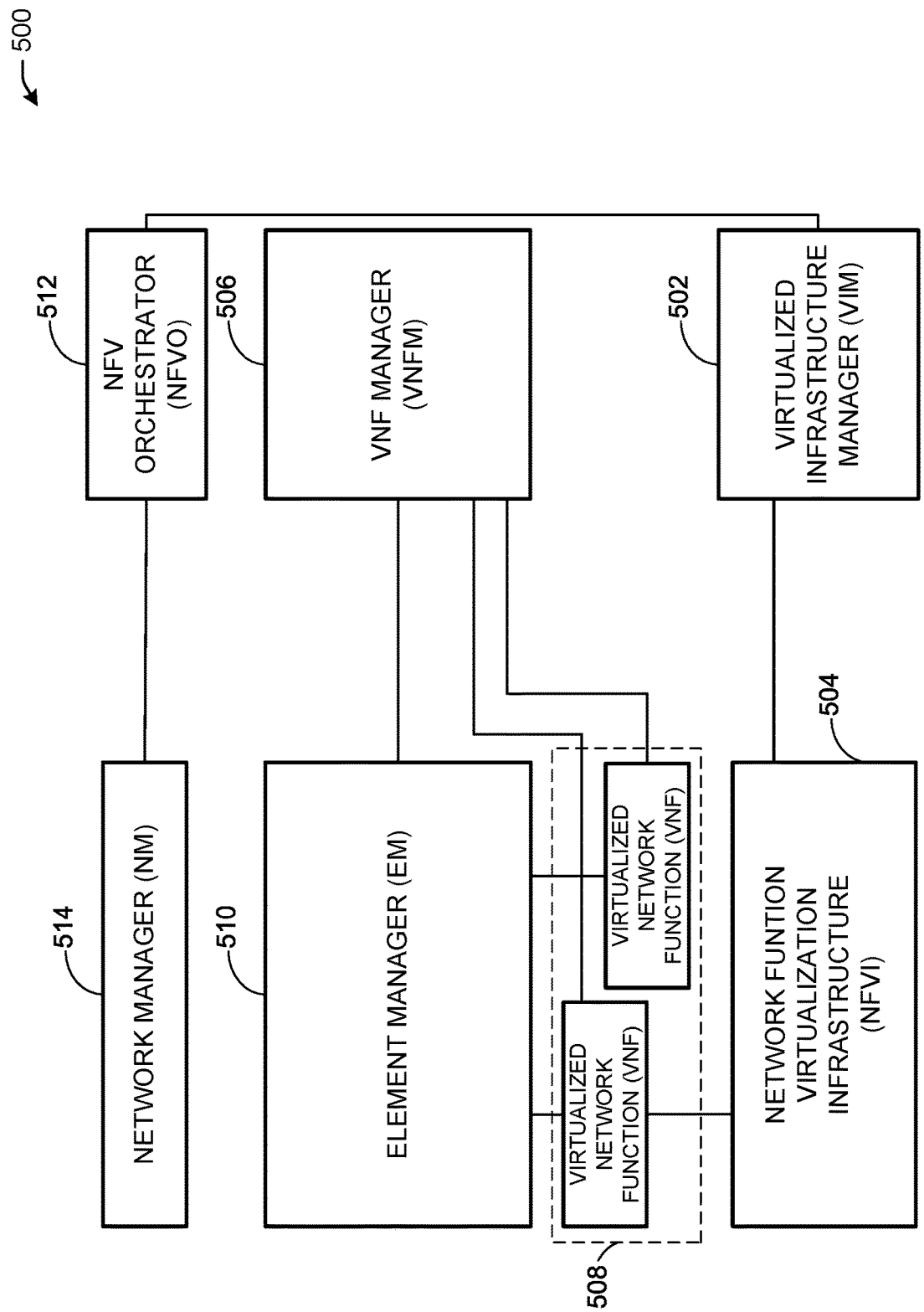
FIG. 5 depicts a block diagram illustrating components of a system to support network function virtualization (NFV), in accordance with one or more example embodiments of the present disclosure.

FIG. 5 depicts a block diagram illustrating components of a system 500 to support NFV, in accordance with one or more example embodiments of the present disclosure. The system 500 is illustrated as including a virtualized infrastructure manager (VIM) 502, a network function virtualization infrastructure (NFVI) 504, a VNF manager (VNFM) 506, virtualized network functions (VNFs) 508, an element manager (EM) 510, an NFV orchestrator (NFVO) 512, and a network manager (NM) 514.

The VIM 502 manages the resources of the NFVI 504. The NFVI 504 can include physical or virtual resources and applications (including hypervisors) used to execute the system 500. The VIM 502 may manage the life cycle of virtual resources with the NFVI 504 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 506 may manage the VNFs 508. The VNFs 508 may be used to execute EPC components/functions. The VNFM 506 may manage the life cycle of the VNFs 508 and track performance, fault and security of the virtual aspects of the VNFs 508. The EM 510 may track the performance, fault and security of the functional aspects of the VNFs 508. The tracking data from the VNFM 506 and the EM 510 may comprise, for example, performance measurement (PM) data used by the VIM 502 or the NFVI 504. Both the VNFM 506 and the EM 510 can scale up/down the quantity of VNFs of the system 500.

The NFVO 512 may coordinate, authorize, release and engage resources of the NFVI 504 in order to provide the requested service (e.g., to execute an EPC function, component, or slice). The NM 514 may provide a package of end-user functions with the responsibility for the management of a network, which may include network elements with VNFs, non-virtualized network functions, or both (management of the VNFs may occur via the EM 510).

Figure 6:
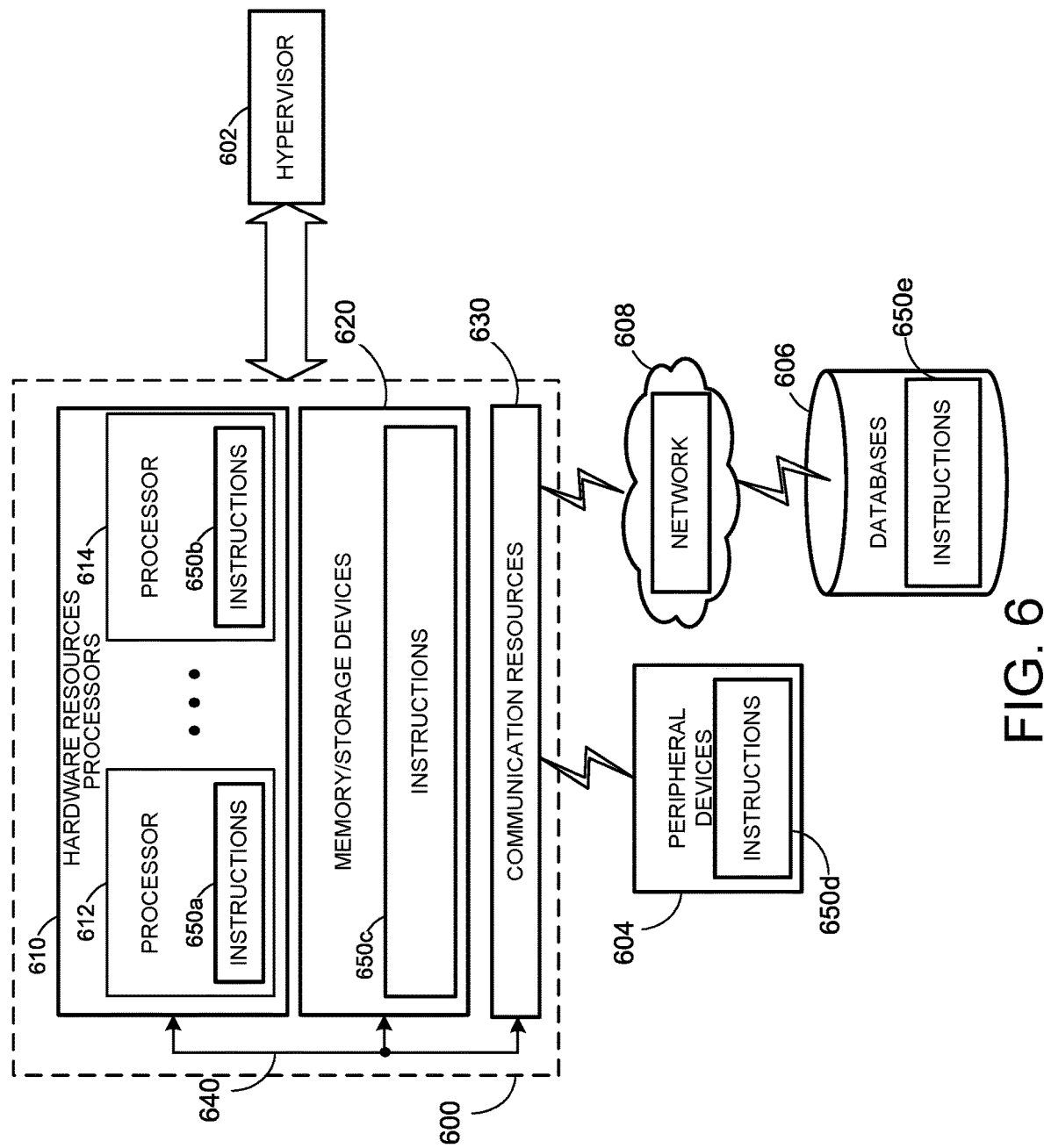
FIG. 6 depicts a block diagram illustrating components able to read instructions from a machine-readable or computer-readable medium (e.g., a non-transitory machine-readable storage medium) and perform any one or more of the methodologies discussed herein, in accordance with one or more example embodiments of the present disclosure.

FIG. 6 depicts a block diagram illustrating components able to read instructions from a machine-readable or computer-readable medium (e.g., a non-transitory machine-readable storage medium) and perform any one or more of the methodologies discussed herein, in accordance with one or more example embodiments of the present disclosure. Specifically, FIG. 6 shows a diagrammatic representation of hardware resources 600 including one or more hardware resources processors (or processor cores) 610, one or more memory/storage devices 620, and one or more communication resources 630, each of which may be communicatively coupled via a bus 640. For embodiments where node virtualization (e.g., NFV) is utilized, a hypervisor 602 may be executed to provide an execution environment for one or more network slices/sub-slices to utilize the hardware resources 600.

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, near field communication (NFC) components, Bluetooth® components (e.g., Bluetooth® Low Energy), Wi-Fi® components, and other communication components.

Instructions 650 (e.g., instructions 650$a$, 650$b$, 650$c$, 650$d$, and 650$e$) may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

In some embodiments, the electronic device(s), network(s), system(s), chip(s) or component(s), or portions or implementations thereof, of the figures herein may be configured to perform one or more processes, techniques, or methods as described herein, or portions thereof.

The following examples pertain to further embodiments.

Example 1 may include an apparatus for telemetry service, wherein the apparatus comprises: a ceilometer polling agent, a ceilometer notification agent, ceilometer pipelines, and Gnocchi; and requests publishing pipeline processing that contains a transformer to perform arithmetic calculations over multiple metrics to produce the desired measurement.

Example 2 may include the apparatus of example 1 or some other example herein, wherein the OpenStack ceilometer notification agent comprising one or more processors is to: receive the messages that contain telemetry metrics from the OpenStack ceilometer polling agent; request publishing pipelines to process the telemetry metrics; and send the outputs of pipelines to Gnocchi for publishing.

Example 3 may include the apparatus of example 1 or some other example herein, wherein the ceilometer polling agent in the NFVI is polling the VM (virtual machine) that periodically collects the usage data of the virtual CPU, memory, disk, and networking resources within an OpenStack deployment.

Example 4 may include the apparatus of example 1 or some other example herein, wherein the telemetry service comprises the following meter types: cumulative to count the number of events in an interval (e.g., networking bytes or packets); and gauge to measure the discrete event with fluctuating values in an interval (e.g., vCPU, memory, disk usages).

Example 5 may include the apparatus of example 3 or some other example herein, wherein the ceilometer polling agent is polling periodically to collect the resource usage metrics that comprise: a cpu_util measurement that is a gauge counter to measure the percentage of CPU utilization of a VM instance in a polling interval; a memory measurement that is a gauge counter to measure the volumes of RAM allocated to a VM instance in a polling interval; a memory.usage measurement that is a gauge counter to measure the volumes of RAM used by a VM instance in a polling interval; a disk measurement that is a gauge counter to measure the amount of disks occupied by a VM instance in a polling interval; a disk.usage measurement that is a gauge counter to measure the volumes of disks used by a VM instance in a polling interval; anetwork.incoming.bytes measurement that is a cumulative counter to measure the number of incoming bytes received by a VM instance in a polling interval; anetwork.outgoing.bytes measurement that is a cumulative counter to measure the number of outgoing bytes received by a VM instance in a polling interval; a network.incoming.packets measurement that is a cumulative counter to measure the number of incoming packets received by a VM instance in a polling interval; and a network.outgoing.packets measurement that is a cumulative counter to measure the number of outgoing packets received by a VM instance in a polling interval.

Example 6 may include the apparatus of example 5 or some other example herein, wherein the VM instance is identified by the Instance ID.

Example 7 may include the apparatus of example 5 or some other example herein, wherein upon collecting the resource usage metrics, the ceilometer polling agent sends the resource usage metrics to the ceilometer notification agent that is located in the VIM.

Example 8 may include the apparatus of examples 5, 7, or some other example herein, wherein the ceilometer notification agent, comprising one or more processors, is to: receive the resource usage metrics from the ceilometer polling agent; use the cpu_util measurement to create the cpu_utilization metric, and send the virtual CPU usage metric to Gnocchi; use the network.incoming.bytes measurement to create a num_of_incoming_bytes metric and send the network incoming bytes metric to Gnocchi; use the network.outgoing.bytes measurement to create a num_of_outgoing_bytes metric and send the network outgoing bytes metric to Gnocchi; use the network.incoming.packets measurement to create a num_of_incoming_packets metric and send the network incoming packets metric to Gnocchi; and use the network.outgoing.packets measurement to create a num_of_outgoing_packets metric and send the network outgoing packets metric to Gnocchi.

Example 9 may include the apparatus of example 8 or some other example herein, wherein the ceilometer notification agent, comprising one or more processors, is to: invoke the pipeline processing that contains a transformer to perform arithmetic calculations using the equation of memory_utilization=100*memory.usage/memory to produce the memory_utilization metric that is the percentage of memory usage by a VM instance in a polling interval; and invoke the pipeline processing that contains a transformer to perform arithmetic calculations using the equation of disk_utilization=100*disk.usage/disk.allocation to produce the disk_utilization metric that is the percentage of disk usage by a VM instance in a polling interval; send the memory_utilization metric to Gnocchi; and send the disk_utilization metric to Gnocchi.

Example 10 may include the virtualized infrastructure manager (VIM) comprising one or more processors that: receive the resource usage metrics from the NFVI; use a collection method to process the resource usage metrics that were received within a collection period to generate the virtualized resource usage measurement for a virtualized resource; and report the virtualized resource usage measurement to the virtualized network function manager (VNFM).

Example 11 may include the subject matter according to example 10 or some other example herein, wherein the VIM further implements the status counter collection method that includes the following: receive a metric at each sampling interval; perform the arithmetic mean computation of the metrics received in the collection period to generate the mean usage measurement; and select the maximum of the metrics received in the collection period to generate the peak usage measurement.

Example 12 may include the subject matter according to example 10 or some other example herein, wherein the VIM further implements the transparent forwarding collection method that includes the following: receive a metric at each sampling interval; and generate a measurement that contains the value of the metric just received.

Example 13 may include the subject matter according to examples 11, 12 or some other example herein, wherein the collection interval is the multiple of a sampling interval.

Example 14 may include the subject matter according to example 10 or some other example herein, wherein upon receiving the resource usage metrics from the NFVI, the VIM, based on the status counter collection method, is to: perform the arithmetic mean of the cpu_utilization metrics that were received within a collection period to generate the mean virtual CPU usage measurement; perform the arithmetic mean of the memory_utilization metrics that were received within a collection period to generate the mean memory usage measurement; perform the arithmetic mean of the disk_utilization metrics that were received within a collection period to generate the mean disk usage measurement; select the maximum metric among the cpu_utilization metrics that were received within a collection period to generate the peak virtual CPU usage measurement; select the maximum metric among the memory_utilization metrics that were received within a collection period to generate the peak memory usage measurement; and select the maximum metric among the disk_utilization metrics that were received within a collection period to generate the peak disk usage measurement.

Example 15 may include the subject matter according to example 10 or some other example herein, wherein upon receiving the resource usage metrics from the NFVI, the VIM, based on the transparent forwarding collection method, is to: generate the number of incoming bytes on a networking resource measurement that contains the content of the num_of_incoming_bytes measurement received from the NFVI; generate the number of outgoing bytes on a networking resource measurement that contains the content of the num_of_outgoing_bytes measurement received from the NFVI; generate the number of incoming packets on a networking resource measurement that contains the content of the num_of_incoming_packets measurement received from the NFVI; and generate the number of outgoing packets on a networking resource measurement that contains the content of the num_of_outgoing_packets measurement received from the NFVI.

Example 16 may include the subject matter according to examples 14, 15 or some other example herein, wherein each measurement is identified by the objectType that represents the type of virtualized resource, and the objectInstanceId that represents the instance of the virtualized resource.

Example 17 may include a device comprising memory and processing circuitry configured to: receive performance data from a network function virtualization infrastructure (NFVI) associated with one or more virtualized resources (VRs) of the NFVI; determine a collection method based on the received performance data; determine a performance measurement associated with the collection method; perform the performance measurement using the received performance data and the collection method; generate one or more outputs based on the performance measurement; and cause to send the one or more outputs to a VNF manager (VNFM).

Example 18 may include the device of example 17 and/or some other example herein, wherein the device may be a virtualized infrastructure manager (VIM) of a 3rd Generation Partnership Project (3GPP) wireless network, and wherein the memory and the processing circuitry are further configured to: determine the performance data may be received during a sampling interval; and determine the one or more outputs during a collection interval.

Example 19 may include the device of example 18 and/or some other example herein, wherein the collection interval may be a multiple of the sampling interval.

Example 20 may include the device of example 17 and/or some other example herein, wherein the collection method may be a status counter collection method or a transport forwarding collection method.

Example 21 may include the device of example 17 and/or some other example herein, wherein the performance data may be associated with one or more resource usage metrics received from a ceilometer polling agent of the NFVI.

Example 22 may include the device of example 21 and/or some other example herein, wherein the one or more resource usage metrics include at least one of a CPU utilization measurement, a memory_utilization measurement, a disk_utilization measurement, a network incoming bytes measurement; a network outgoing bytes measurement, a network incoming packets measurement, or a network outgoing packets measurement.

Example 23 may include the device of example 17 and/or some other example herein, wherein the memory and the processing circuitry are further configured to determine a template used for the performance measurement, wherein the template comprises a collection method, a trigger condition, a measurement unit, a measurement group, and a measured object type.

Example 24 may include the device of example 17 and/or some other example herein, wherein the performance measurement may be at least one of a mean virtual central processing unit (CPU) usage, a mean memory usage, a mean disk usage, mean disk usage, a number of incoming bytes on a networking resource, a number of outgoing bytes on a networking resource, a number of incoming packets on networking resource, or a number of outgoing packets on a networking resource.

Example 2 may include the device of example 17 and/or some other example herein, wherein the memory and the processing circuitry are further configured to: generate a mean performance measurement using a status counter collection method; determine an arithmetic mean of the performance data received within a collection period, wherein the performance data comprises at least one of a mean virtual CPU usage, a mean memory usage, or a mean disk usage.

Example 26 may include the device of example 17 and/or some other example herein, wherein the memory and the processing circuitry are further configured to: generate a peak performance measurement using a status counter collection method; determine a maximum metric among the performance data received within a collection period, wherein the performance data comprises at least one of a peak virtual CPU usage, a peak memory usage, or a peak disk usage.

Example 27 may include the device of example 17 and/or some other example herein, wherein the memory and the processing circuitry are further configured to: generate a data volume measurement by using a transparent forwarding collection method; forward a content of performance data received from the NFVI, wherein a content of the performance data comprises at least one of a number of incoming bytes, a number of outgoing bytes, a number of incoming packets, or a number of outgoing packets.

Example 28 may include a computer-readable medium storing computer-executable instructions which when executed by one or more processors result in performing operations comprising: polling, by a ceilometer polling agent of an network function virtualization infrastructure (NFVI), one or more virtual machines at a predetermined interval; receiving usage data associated with the one or more virtual machines; causing to send the usage data to a virtualized infrastructure manager (VIM); determining a performance measurement received from the VIM, wherein the performance measurement may be associated with the usage data, and wherein the performance measurement may be determined during a collection interval; and adjusting resources associated with the one or more virtual machines based on the performance measurement.

Example 29 may include the computer-readable medium of example 28 and/or some other example herein, wherein the usage data may be associated with a central processing unit (CPU) utilization measurement, a memory_utilization measurement, a disk_utilization measurement, a network incoming bytes measurement; a network outgoing bytes measurement, a network incoming packets measurement, or a network outgoing packets measurement.

Example 30 may include the computer-readable medium of example 28 and/or some other example herein, wherein the receiving of the usage data comprises receiving the usage data during a sampling interval.

Example 31 may include the computer-readable medium of example 28 and/or some other example herein, wherein the performance measurement may be associated with an OpenStack deployment.

Example 32 may include the computer-readable medium of example 30 and/or some other example herein, wherein the collection interval may be a multiple of the sampling interval.

Example 33 may include the computer-readable medium of example 28 and/or some other example herein, wherein the performance measurement comprises at least one of a mean virtual CPU usage, a mean memory usage, a mean disk usage, a peak disk usage, a number of incoming bytes on a networking resource, a number of outgoing bytes on a networking resource, a number of incoming packets on a networking resource, or a number of outgoing packets on a networking resource.

Example 34 may include a method comprising: receiving, by one or more processors of a virtualized infrastructure manager (VIM), performance data from a network function virtualization infrastructure (NFVI) associated with one or more virtualized resources (VRs) of the NFVI; determining a collection method based on the received performance data; determining a performance measurement associated with the collection method; performing the performance measurement using the received performance data and the collection method; generating one or more outputs based on the performance measurement; and causing to send the one or more outputs to a VNF manager (VNFM).

Example 35 may include the method of example 34 and/or some other example herein, further comprising: determining the performance data may be received during a sampling interval; and determining the one or more outputs during a collection interval.

Example 36 may include the method of example 34 and/or some other example herein, wherein the collection method may be a status counter collection method or a transport forwarding collection method.

Example 37 may include the method of example 34 and/or some other example herein, further comprising: generating a mean performance measurement using a status counter collection method; determining an arithmetic mean of the performance data received within a collection period, wherein the performance data comprises at least one of a mean virtual CPU usage, a mean memory usage, or a mean disk usage.

Example 38 may include the method of example 34 and/or some other example herein, further comprising: generating a peak performance measurement using a status counter collection method; determining a maximum metric among the performance data received within a collection period, wherein the performance data comprises at least one of a peak virtual CPU usage, a peak memory usage, or a peak disk usage.

Example 39 may include the method of example 34 and/or some other example herein, further comprising: generating a data volume measurement by using a transparent forwarding collection method; forwarding a content of performance data received from the NFVI, wherein a content of the performance data comprises at least one of a number of incoming bytes, a number of outgoing bytes, a number of incoming packets, or a number of outgoing packets.

Example 40 may include an apparatus comprising means to perform one or more elements of a method described in or related to any of the examples 1-39, or any other method or process described herein.

Example 41 may include one or more computer-readable media comprising instructions to cause an electronic device, upon execution of the instructions by one or more processors of the electronic device, to perform one or more elements of a method described in or related to any of the examples 1-39, or any other method or process described herein.

Example 42 may include an apparatus comprising logic, modules, or circuitry to perform one or more elements of a method described in or related to any of the examples 1-39, or any other method or process described herein.

Example 43 may include a method, technique, or process as described in or related to any of the examples 1-39, or portions or parts thereof.

Example 44 may include an apparatus comprising: one or more processors and one or more computer-readable media comprising instructions that, when executed by the one or more processors, cause the one or more processors to perform the methods, techniques, or processes as described in or related to any of the examples 1-39, or portions thereof.

Example 45 may include a signal as described in or related to any of the examples 1-39, or portions or parts thereof.

Example 46 may include a signal in a wireless network as shown and described herein.

Example 47 may include a method of communicating in a wireless network as shown and described herein.

Example 48 may include a system for providing wireless communication as shown and described herein.

Example 49 may include a device for providing wireless communication as shown and described herein.

The foregoing description of one or more implementations provides illustration and description, but is not intended to be exhaustive or to limit the scope of the embodiments to the precise form disclosed. Modifications and variations are possible in light of the above teachings or may be acquired from the practice of various embodiments.

What is claimed is:

1. A non-transitory computer-readable medium storing computer-executable instructions which when executed by one or more processors result in performing operations comprising:
    polling, by a ceilometer polling agent of a network function virtualization infrastructure (NFVI), one or more virtual machines at a predetermined interval;
    receiving usage data associated with the one or more virtual machines;
    causing to send the usage data to a virtualized infrastructure manager (VIM);
    determining a performance measurement associated with the usage data and received from the VIM, and wherein the performance measurement is determined during a collection interval; and
    adjusting resources associated with the one or more virtual machines based on the performance measurement.

2. The non-transitory computer-readable medium of claim 1, wherein the usage data is associated with a central processing unit (CPU) utilization measurement, a memory utilization measurement, a disk utilization measurement, a network incoming bytes measurement; a network outgoing bytes measurement, a network incoming packets measurement, or a network outgoing packets measurement.

3. The non-transitory computer-readable medium of claim 1, wherein the receiving of the usage data comprises receiving the usage data during a sampling interval.

4. The non-transitory computer-readable medium of claim 1, wherein the performance measurement is associated with an OpenStack deployment; and wherein one or more outputs are generated and sent to a VNF manager (VNFM) based on the performance measurement.

5. The non-transitory computer-readable medium of claim 3, wherein the collection interval is a multiple of the sampling interval.

6. The non-transitory computer-readable medium of claim 1, wherein the performance measurement comprises at least one of a mean virtual CPU usage, a mean memory usage, a mean disk usage, a peak disk usage, a number of incoming bytes on a networking resource, a number of outgoing bytes on a networking resource, a number of incoming packets on a networking resource, or a number of outgoing packets on a networking resource.

* * * * *